July 9, 1968  W. R. BACKER  3,391,498
STABILIZING AND SUPPORTING MEANS FOR A ROTATING ELEMENT
Filed Oct. 23, 1965  4 Sheets-Sheet 1

INVENTOR
WILLIAM R. BACKER
BY
ATTORNEY

July 9, 1968

W. R. BACKER 3,391,498

STABILIZING AND SUPPORTING MEANS FOR A ROTATING ELEMENT

Filed Oct. 23, 1965

INVENTOR
WILLIAM R. BACKER
BY
*James M. Smith Jr.*
ATTORNEY

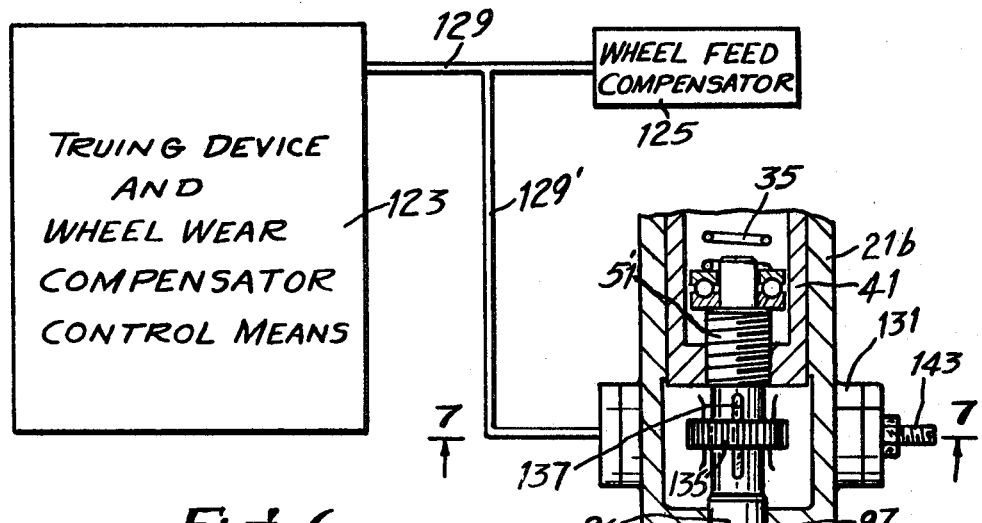
Fig. 6
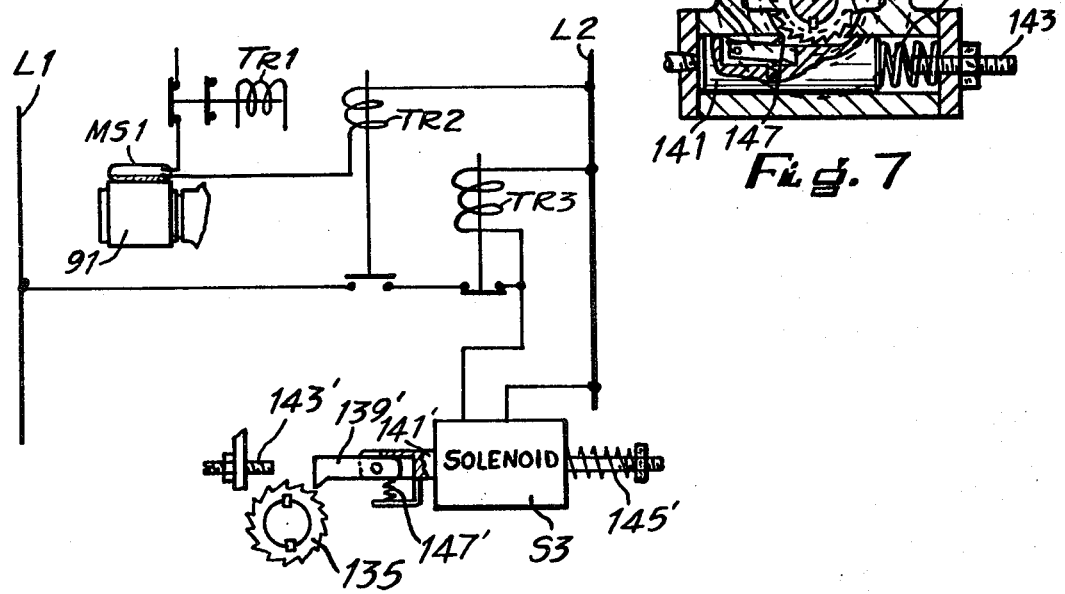
Fig. 7
Fig. 8
INVENTOR
WILLIAM R. BACKER
BY
ATTORNEY

United States Patent Office 3,391,498
Patented July 9, 1968

3,391,498
STABILIZING AND SUPPORTING MEANS FOR
A ROTATING ELEMENT
William R. Backer, Holden, Mass., assignor to
Norton Company, Worcester, Mass., a corporation of Massachusetts
Filed Oct. 23, 1965, Ser. No. 504,039
10 Claims. (Cl. 51—169)

ABSTRACT OF THE DISCLOSURE

Apparatus including a rotating element selectively either fully constrained for rotation below its critical speed about a predetermined fixed axis or yieldably constrained for rotation above its critical speed about its center of gravity subject also to radial displacement from the fixed axis due to its weight, and a biasing mechanism including a very light biasing spring operative when the rotating element is fully constrained to maintain substantially no load engagement therewith, and a heavy biasing spring operative when the rotating element is yielding constrained to limit radial displacement of the rotating element due to its weight.

---

Figure 1:
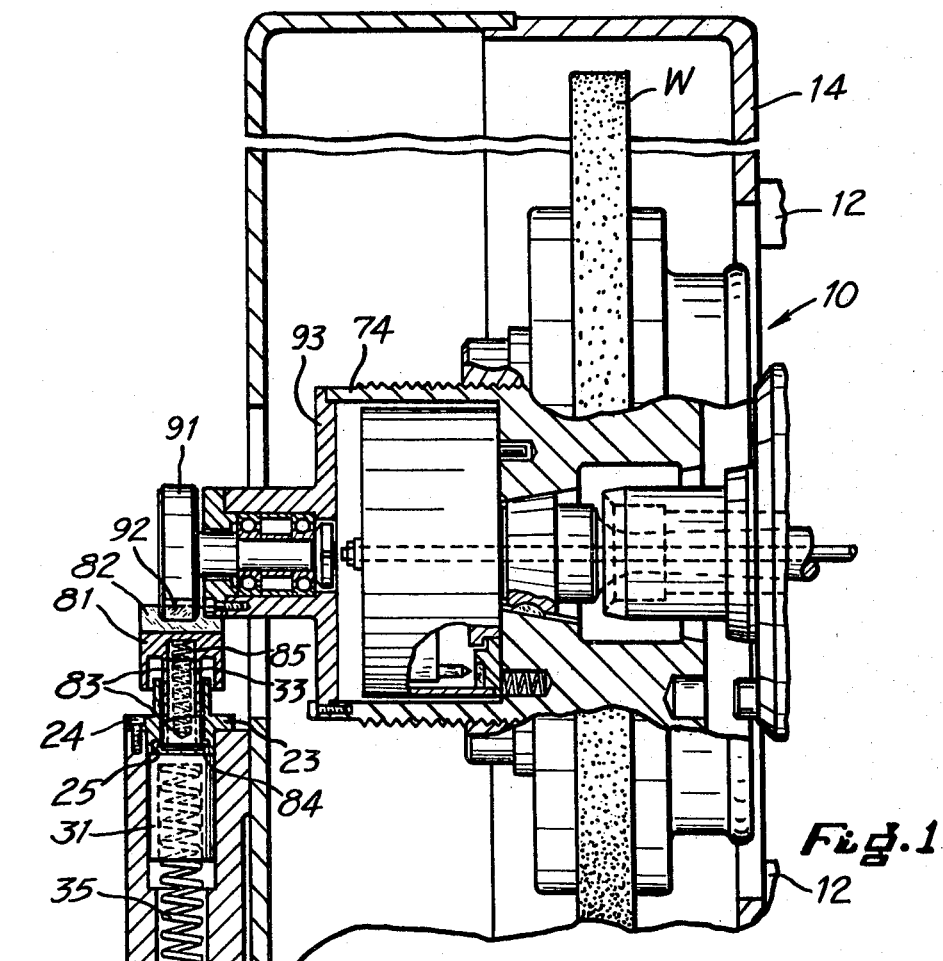

The present invention relates to a stabilizing and supporting means for a rotating element and particularly to a stabilizing and auxiliary supporting means therefore operable to limit the radial displacement of a rotating element while it is yieldably supported for rotation above its critical speed, for example, during the operation of a balancing means supported by the rotating element and operable automatically to balance the rotating element.

An automatic balancing device for a rotating element of the type illustrated in Patent No. 3,107,550 of Backer et al. and in Patent No. 3,218,884 of Backer et al. automatically operable to balance a rotating element such as a grinding wheel or other cutting tool precisely while the rotating element is supported for rotation above its critical speed, is fully effective and entirely satisfactory for many installations. The same may be said for the balancing devices described and illustrated in Patents Nos. 1,967,163 of Thearle, 2,142,021 of Ernst et al., 2,507,558 of Dall et al. also operable on the principle described in Thearle 1,967,163.

It has been noted previously that there are certain sizes and configurations of grinding wheel spindle assemblies in relatively small sizes in which the grinding wheel demonstrates an objectionable degree of instability when it is supported for rotation above its critical speed to provide for the automatic operation of the balancing device. In addition, it has been noted previously that excessive initial unbalance in a grinding wheel, such as that caused by the weight of an accumulation of a grinding fluid in one sector of the grinding wheel, may cause a high degree of instability momentarily after the grinding wheel spindle assembly has been released for rotation above its critical speed. In both such instances, it is desirable to provide a stabilizing means effective to preclude unstable movement of the grinding wheel while it is supported for rotation above its critical speed, provided that the stabilizing means is operable for this purpose without significantly interfering with the operation of the balancing device.

Furthermore, it has been noted previously that both the radial displacement and angular deflection of a relatively large and heavy grinding wheel may be very substantial when the grinding wheel spindle is released for rotation above its critical speed. In this instance, it is desirable to provide an auxiliary supporting means effective to limit the radial displacement of the grinding wheel while it is supported for rotation above its critical speed, provided that this supporting means is operable for this purpose without significantly interfering with the operation of the balancing device.

Both of these objectives have been met previously by the provision of a stabilizing and auxiliary supporting means arranged so that it is completely inoperative and is maintained entirely out of engagement with the cooperating rotating element while the rotating element is supported for rotation below its critical speed about a predetermined fixed axis, and so that the stabilizing and auxiliary supporting means is automatically operable when the cooperating rotating element is yieldably supported for rotation above its critical speed both to prevent unstable movement of the rotating element and to provide auxiliary support for the rotating element without interfering with the automatic operation of a balancing device mounted upon the rotating element.

The instant invention contemplates a heavy-duty stabilizing and auxiliary supporting means particularly useful in association with a rotating element which is both heavy and of a relatively large diameter. For example, when the rotating element comprises a grinding wheel used to grind crankshafts, it may be as much as 42" in diameter and 3" thick so that the total weight of the grinding wheel and the associated yieldably supported portion of a supporting spindle assembly exceeds 550 pounds. This heavy-duty stabilizing and auxiliary supporting means is arranged to be maintained continuously in engagement with a rotating element so that it is automatically operative when the rotating element is yieldably supported for rotation above its critical speed to prevent unstable movement of the rotating element and to provide auxiliary support for the rotating element without interfering with the automatic operation of a balancing device mounted upon the rotating element. Notwithstanding its continuous engagement with the rotating element, this heavy-duty stabilizing and auxiliary supporting means is also arranged so that it is inoperative and does not impose any substantial radial load upon the rotating element while the rotating element is supported for rotation below its critical speed about a predetermined fixed axis.

In its simplest embodiment the stabilizing and auxiliary supporting means of the instant invention provides yieldable auxiliary support for the rotating element, while the rotating element is rotated above its critical speed, by means of a primary biasing means consisting of a heavy compression spring engaged by a constraining means fixedly positioned to preload the compression spring.

In the preferred embodiment of the stabilizing and auxiliary supporting means of the instant invention the preloaded compression spring comprising the primary biasing means and the cooperating constraining means are supported by actuating means automatically operative, before the rotating element is released for rotation above its critical speed, to advance the elements of the inventive apparatus supported thereby a predetermined distance toward the rotating element.

In yet another modification of the stabilizing and auxiliary supporting means of the instant invention particularly useful for those applications in which the weight of the rotating element may be varied over an extremely wide range, the automatically operative actuating means incorporated in the preferred embodiment is augmented by an arrangement for varying the preload applied to the compression spring comprising the primary biasing means which includes a constraining means for the compression spring adjustably fixedly positioned, an adjustment means for the constraining means, and automatic control means for actuating the adjustment means to reduce the preload as the weight of the rotating element is reduced.

In all three embodiments of the instant invention referred to above, there is a primary stop means arranged to cooperate with the constraining means to preload the compression spring comprising th primary biasing means. Both in the simplest embodiment and in the preferred embodiment of the instant invention, the primary stop means is mounted in fixed spaced relation to the constraining means so that the preload on the compression spring is maintained constant, while in the third embodiment of the instant invention described above the primary stop remains in a fixed position when the adjustable constraining means is moved to different fixed positions to vary the preload.

It should be noted that the radial displacement of the rotating element is made up of two components, the cyclic displacement of the geometric central axis of the rotating element, for example during a balancing operation, when it follows a diminishing spiral path about the center of gravity of the rotating element, and what may be described as the mean radial deflection of the geometric central axis of the rotating element which varies as a direct function of the weight of the rotating element mounted on a given apparatus. Furthermore, it is the magnitude of the latter component, that is the mean radial deflection as a function of the weight of the rotating element, which must be limited in some instances in order to avoid either instability or an objectionable amount of angular deflection of the rotating element. Hence, it is the function of the instant invention to at least reduce the mean radial deflection and at best substantially eliminate the mean radial deflection.

This result is accomplished to varying degrees by the respective embodiments of the instant invention referred to above. The simplest embodiment must permit some downward mean radial deflection in order to be operative, but is thereafter effective to reduce the amount of mean radial downward deflection for a rotating element of a given weight. The preferred embodiment of the instant inventon is effective for a given range of weights of the rotating element to shift the range of mean radial deflections with a given preload from that between a relatively small downward deflection for the minimum weight and an objectionable relatively large downward deflection for the maximum weight to a preferred range of mean radial deflections bracketing the position in which the rotating element is supported for rotation about a predetermine fixed axis, that is a range of deflection extending between an upward mean radial deflection for the minimum weight and an equal downward mean radial deflection for the maximum weight. The third embodiment of the instant invention adds on an arrangement for adjusting the preload automatically as weight of the rotating element is varied over a given range so as to substantially eliminate the mean deflection for any weight within the given range.

An object of the present invention is the provision of a stabilizing and auxiliary supporting means maintained continuously in engagement with a large and heavy rotating element selectively rigidly supported for rotation about a predetermined fixed axis and alternatively yieldably supported for rotation above its critical speed, said stabilizing and auxiliary supporting means being operative to limit the radial displacement of the rotating element from its fixed axis of rotation only while the rotating element is rotated above its critical speed.

Another object is the provision of a stabilizing and auxiliary supporting means mounted so that it is continuously maintained in engagement with a relatively large and heavy rotating element selectively rigidly supported for rotation about a predetermined fixed axis and alternatively yieldably supported for rotation above its critical speed, said stabilizing and auxiliary supporting means being arranged so that it does not impose either substantial rotational restraint or a substantial radial load upon the rotating element when it is rigidly supported for rotation about a predetermined fixed axis.

Still another object is the provision of a stabilizing and auxiliary supporting means for a large and heavy rotating element selectively rigidly supported for rotation about a predetermined fixed axis and alternatively yieldably supported for rotation above its critical speed, said stabilizing and auxiliary supporting means including a biasing means subjected to a predetermined preload and means adjustable to vary the preload imposed upon the biasing means.

A further object is the provision of a stabilizing and auxiliary supporting means for a relatively large and heavy rotating element selectively rigidly supported for rotation about a predetermined fixed axis and alternatively yieldably supported for rotation above its critical speed, said stabilizing and auxiliary supporting means including a biasing means with a predetermined preload applied thereto and an actuating means operative automatically before the rotating means is released for rotation above its critical speed to advance said biasing means a predetermined distance toward the rotating element without altering the predetermined preload applied to the biasing means.

A final object is the provision of a stabilizing and auxiliary supporting means for a relatively large and heavy rotating element selectively rigidly supported for rotation about a predetermined fixed axis and alternatively yieldably supported for rotation above its critical speed, said stabilizing and auxiliary supporting means including a biasing means subjected to a predetermined preload, adjustment means operative to vary the preload imposed upon the biasing means, and automatic control means operative to actuate the adjustment means whenever the weight of the rotating element is reduced by a significant amount.

Figure 2:
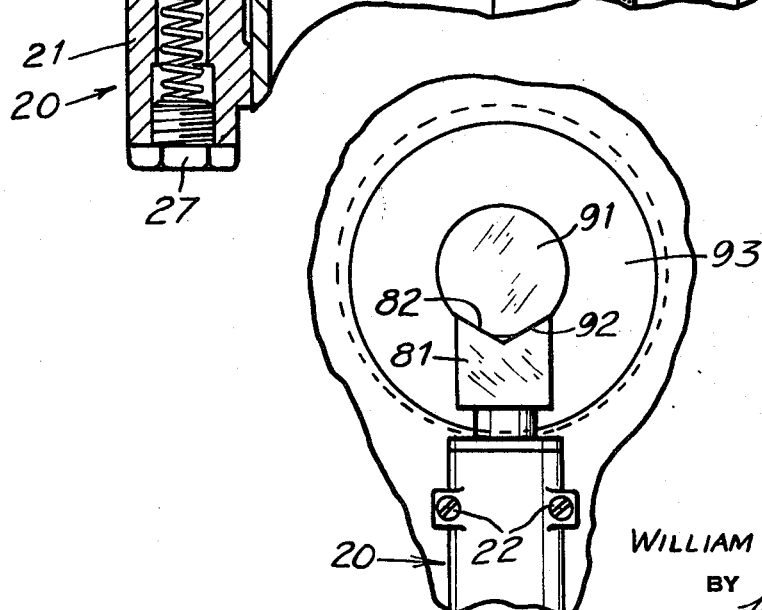
Figure 3:
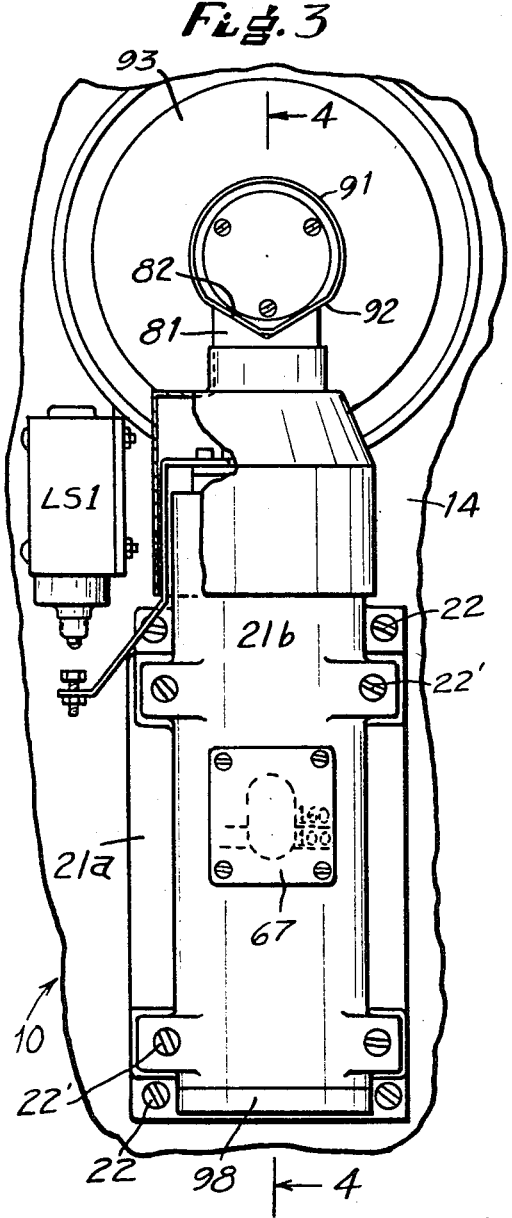
Figure 4:
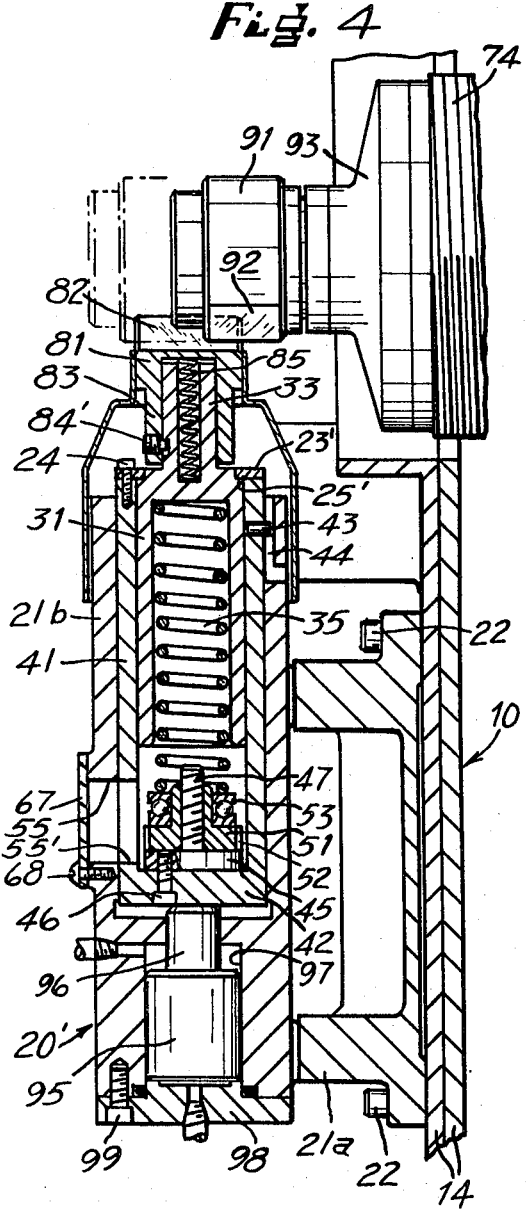
Figure 9:
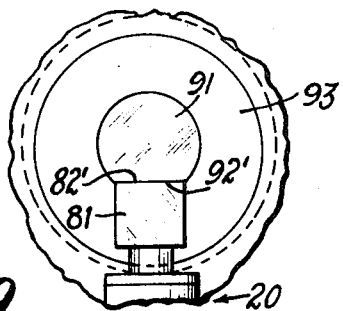
Figure 5:
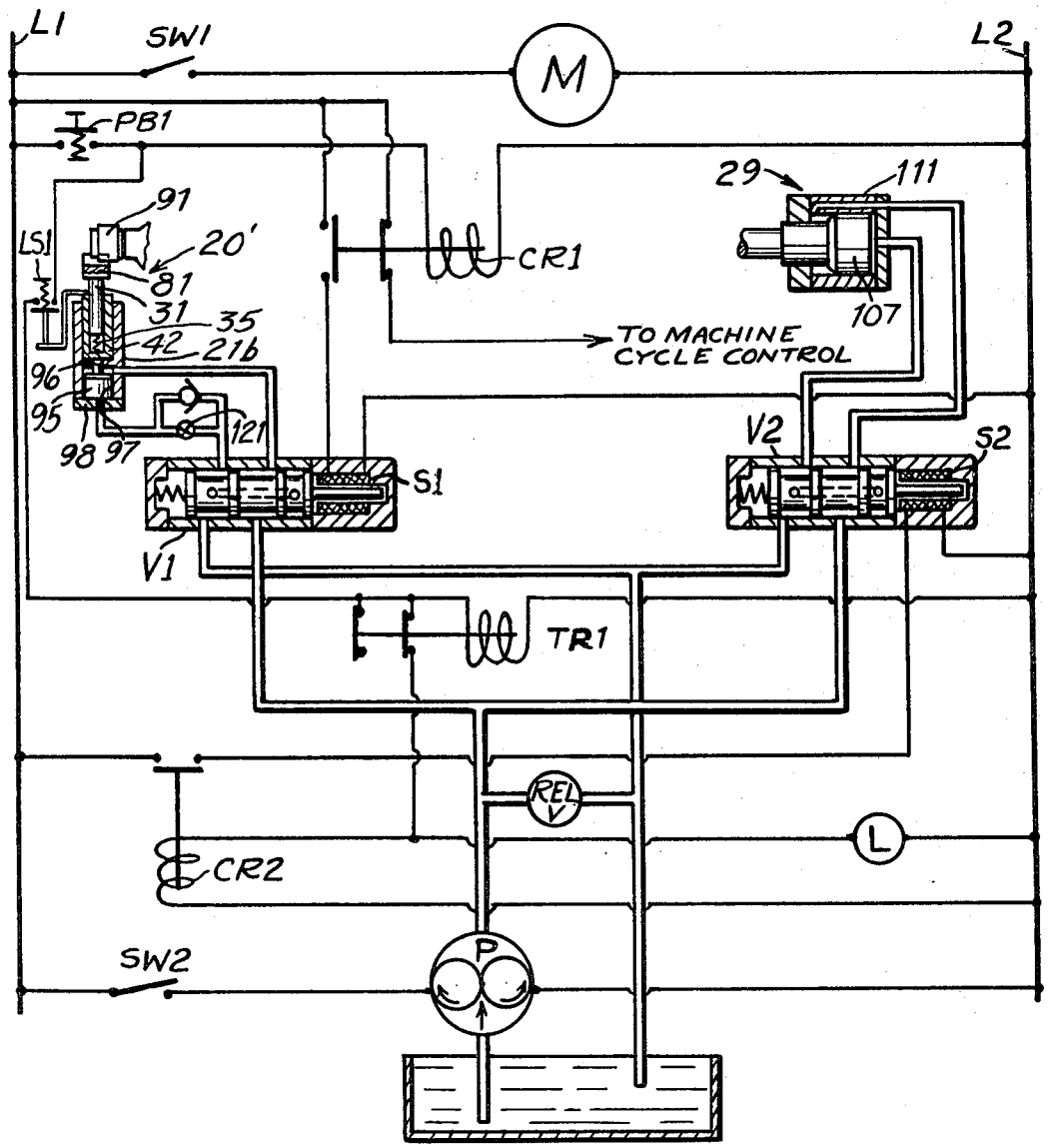

Other objects and advantages of the instant invention will be evident from consideration of the following description and the showing in the accompanying drawings wherein:

FIG. 1 is a vertical section through a portion of a grinding machine including a showing of a grinding wheel and a portion of the spindle assembly on which it is mounted and also illustrating a simplified embodiment of the stabilizing and auxiliary supporting means of the instant invention, FIG. 2 is a partial end-view of the structure shown in FIG. 1 as seen from the left-hand side of FIG. 1, FIG. 3 is a side elevation of the preferred embodiment of the instant invention illustrated in operative relation to a spindle assembly corresponding to that illustrated in FIG. 1, FIG. 4 is a vertical section taken on line 4—4 of FIG. 3, FIG. 5 is a simplified schematic representation of the control system first operable to actuate the preferred embodiment of the stabilizing and auxiliary supporting means of the instant invention illustrated in FIG. 3 and 4 and then automatically operative to release the rotating element for rotation above its critical speed and then to release the balancing means mounted thereon as illustrated in FIG. 1, FIGS. 6 and 8 are simplified schematic representations of two forms of the control system for a third embodiment of the instant invention in which the control system illustrated is arranged to actuate an adjustment means for varying the preload on this embodiment of the instant invention, and is responsive to an impulse indicating a significant reduction in the weight of a rotating element to be supported by the stabilizing and auxiliary supporting means of the instant invention, FIG. 7 is a partial section taken substantially on line 7—7 of FIG. 6 showing details of the adjustment means illustrated in FIG. 6, and FIG. 9 is similar to FIG. 2 but shows a modification.

Referring now to the drawings wherein like reference numerals refer to like or corresponding parts, FIG. 1 illustrates a portion of a conventional grinding machine generally designated by the reference numeral 10 including a showing of portions of a wheel slide 12 constituting mounting means to which a wheel guard 14 is fixedly secured by suitable attachment means not illustrated such as attachment screws, so that the wheel guard 14 encloses a grinding wheel W secured to and rotatable with a wheel hub 74 in turn secured to and rotatable with the associated portion of a wheel spindle assembly in the manner illustrated and described in detail in Patent No. 3,218,884. The details of these features of a grinding machine will not be described in detail in this application because they form no part of the instant invention and because various suitable arrangements for mounting and rotating a grinding wheel W are described in detail in the several patents referred to above.

The embodiment of the stabilizing and auxiliary supporting means generally designated by reference numeral 20 in FIG. 1 includes a support 21 comprising a generally cylindrical hollow body fixedly secured to the wheel guard 14 by suitable mounting means such as the attachment screws 22 shown in FIG. 2, said cylindrical body being fitted with a cap member 23 secured thereto by attachment screws 24 and provided with a central opening therethrough encircled by a dependent shoulder 25. A threaded plug 27 engaged with the lower end of the cylindrical body confines within the cylindrical body a biasing means including a hollow plunger 31 provided with an upstanding hollow sleeve 33 projecting through the central opening in the cap member 23 and also includes a preloaded heavy primary biasing spring 35 with its lower end engaging the threaded plug 27 and its upper end engaging the closed end of the hollow plunger 31 so that plunger 31 is biased against a stop fixed relative to the cylindrical body consisting of the dependent shoulder 25.

The cylindrical body also supports a shoe 81 provided with a pair of flats 82 disposed at an obtuse angle and also including a dependent hollow sleeve 83 encircling the upstanding hollow sleeve 33 on which it is slidably mounted and provided with a groove at its lower end to receive a locking ring 84 arranged to engage the underside of the cap member 23. A very light secondary biasing spring 85 disposed within the upstanding hollow sleeve 33 acts against the shoe 81 to bias the locking ring 84 into engagement with the underside of cap member 23.

The support 21 is so mounted upon the wheel guard 14 that shoe 81 is continuously maintained in engagement with the hub supported member 91 including a disc portion provided with a pair of flats 92 respectively engaging flats 82 on shoe 81 as shown best in FIG. 2.

Since the hub supported member 91 is constrained against rotation by the engagement of flats 92 with flats 82 on the shoe 81, and since the spindle extension 93 to which the hub supported member 91 is secured is mounted upon the hub 74 for rotation with the spindle assembly on which hub 74 is mounted, the hub supported member 91 also includes a stub shaft projecting from the disc portion and supported by a suitable antifriction bearing assembly in turn supported within the spindle extension 93.

Referring now to the showing of the preferred embodiment of the instant invention in FIG. 4, it will be noted that this embodiment of the instant invention incorporates features corresponding to all of the features described immediately above and also additional features described in detail further below.

The stabilizing and auxiliary supporting means generally designated by reference numeral 20' in FIG. 4 includes a support comprising a saddle 21a fixedly secured to wheel guard 14 by suitable mounting means such as attachment screws 22 and a hollow cylindrical body 21b fixedly secured to saddle 21a by the attachment screws 22' illustrated in FIG. 3. The cap member 23' with a central opening therethrough is secured by attachment screws 24 to a hollow cylindrical socket member 41 described further below rather than directly to the cylindrical body 21b and includes an inner portion identified by reference numeral 25' overhanging the open end of socket member 41 so that it performs a function corresponding to that of dependent shoulder 25 illustrated in FIG. 1 and described above. Accordingly, the biasing means including the hollow plunger 31 provided with an upstanding hollow sleeve 33 extending through the central opening in cap member 23' and also including preloaded heavy biasing spring 35 is confined within the hollow cylindrical socket member 41 with a closed lower end wall 42 mounted slidably within the cylindrical body 21b and constrained against rotation relative to the cylindrical body 21b by interaction of the guide pin 43 projecting from the hollow cylindrical socket member 41 and the elongated slot 44 in the inner surface of cylindrical body 21b.

In the embodiment of the instant invention illustrated in FIG. 4, the locking ring 84 engaging the dependent hollow sleeve 83 is replaced with a set screw 84' threadably engaging the dependent hollow sleeve 83 and projecting into a recess in the upstanding hollow sleeve 33 long enough to permit substantially the same limited displacement of shoe 81 relative to the hollow plunger 31.

The additional features incorporated in the preferred embodiment of the stabilizing and auxiliary supporting means 20' illustrated in FIG. 4 consist of an adjustable means for varying the preload on biasing spring 35 and an actuating means for displacing the hollow cylindrical socket member 41 and the biasing means contained thereby toward the rotating element. The adjustable means for varying the preload includes a pad 45 secured to the end wall 42 by suitable mounting means such as attachment screws 46 and provided with a threaded post 47 engaged by a threaded adjustable stop 51 provided with spaced notches 52 on its periphery to facilitate its manual adjustment and supporting an antifriction bearing assembly 53 engaged by the lower end of biasing spring 35. The actuating means, which may be operated automatically by a control system illustrated schematically in FIG. 5 and described below, includes a piston 95 with a reduced extension thereof 96 disposed in engagement with the end wall 42 and a cylinder 97 located in the lower end of cylindrical member 21b and closed by an end cap 98 secured by attachment screws 99 to the cylindrical member 21b, so that piston 95 is enclosed within cylinder 97 as shown in FIG. 4.

FIG. 5 illustrates a suitable circuit for effecting a wheel balancing operation similar to that illustrated in FIG. 5 of Backer et al., Patent 3,107,550, but also including the automatic control means for the actuating means described above and illustrated in FIG. 5 in a simplified schematic representation of the stabilizing and auxiliary supporting means 20'. This automatic control means includes a pushbutton PB1 arranged to be closed and held closed manually for about 5 seconds to complete the balancing operation. When the pushbutton PB1 is held closed the control relay CR1 is energized, opening its normally closed contacts to de-energize the grinding machine cycle control, and closing its normally open contacts to energize the solenoid S1 to shift the spool of valve V1 to the left to admit pressure fluid to the bottom of the cylinder 97 to move the piston 95 upwardly within the cylindrical member 21b until the normally open contacts of the limit switch LS1 are closed. When the limit switch LS1 is closed, the dynamically actuated balancing device arranged as described and illustrated in Backer et al. Patent 3,107,550 is operated by the linear actuator mechanism 29, because limit switch LS1 energizes solenoid S2 to shift the spool of valve V2 to the left to admit pressure fluid to the right-hand end of cylinder assembly 111 so that it acts to displace the piston 107 to the left as seen in FIG. 5 to initiate the balancing cycle. Since the solenoid S2 is energized by limit switch LS1 by completing a circuit through the normally closed contacts of a time delay relay TR1 to energize the control relay CR2 to close its normally open contacts, the piston 107 will be returned to the position shown in FIG. 5 to complete the balancing cycle when the time delay relay TR1, set to delay opening for the short time interval required for a balancing operation, times out to open its contacts and thereby de-energize the control relay CR2.

When the light L energized with control relay CR2 goes out to indicate that the balancing cycle has been completed, the pushbutton PB1 may be released to de-energize solenoid S1, so that the spool of valve V1 shifts to the right as seen in FIG. 5 to exhaust pressure fluid from the lower end of cylinder 97 through the metering valve 121.

In a third embodiment of the instant invention, the adjustable stop 51 and the threaded post 47 arranged within socket member 41 as illustrated in FIG. 4 are replaced with a threaded adjustable stop 51' as shown in FIG. 6 for cooperation with an automatically controlled actuating means such as that illustrated in FIGS. 6 and 7 to which the following description refers. FIG. 7 does not include any specific features of the truing device and wheel wear compensator control means 123 or any specific features of the wheel feed compensator 125 because such apparatus is already well known in the art. For example, Alvord Patent 2,894,360 describes in detail and illustrates in FIG. 6 thereof an automatically cycled truing device for a grinding wheel associated with a wheel wear compensator control means operatively connected to a wheel feed compensator through a fluid conduit 129. The showing in FIG. 6, includes, in addition to the combination of features illustrated and described in Alvord 2,894,360, an automatic control means for varying the preload on the biasing spring 35 comprising an additional fluid conduit 129' interconnecting conduit 129 and an actuating means thus rendered operable in response to the cyclic operation of the truing device and wheel wear compensator control means 123.

As illustrated in FIG. 6, this actuating means consists of a hollow cylinder assembly 131 which may be formed integrally or otherwise fixedly connected to the cylindrical member 21b.

Referring now to FIG. 7, it will be seen that the cylinder assembly 131 is slotted to receive a ratchet wheel 135 slidably connected to the threaded adjustable stop 51' and so disposed within the cylinder assembly 131 that it is engaged by the pawl 139, pivotally mounted upon a piston 141, when the piston 141 is moved to the right as seen in FIG. 7 by pressure fluid admitted through conduit 129'. The actuating means illustrated in FIGS. 6 and 7 also includes an adjustable stop 143, a return spring 145, and a spring 147 arranged to bias the pawl 139 into engagement with the ratchet wheel 135.

An alternative configuration of the automatic control means for varying the preload on the biasing spring 35 is illustrated in FIG. 8 as comprising a detecting means mounted upon the grinding means responsive to a significant change in the weight of the grinding wheel W and a modified alternative configuration of the actuating means for the means of adjusting the preload.

The detecting means sensitive to a critical change in its attitude as a function of a significant change in the weight of the grinding wheel W is illustrated in FIG. 8 as comprising a mercury switch fixedly secured to the hub supported member 91 connected in series with a second pair of normally closed contacts of the time delay relay TR1 shown in FIG. 5 so that the mercury switch MS1 is included in the circuit activated by closure of the normally open contacts of the limit switch LS1 to initiate a wheel balancing operation. Since the mercury switch MS1 is subject to dithering during the cyclic radial displacement of the grinding wheel and its supporting rotating assembly during the balancing operation, the circuit including the contacts of the mercury switch MS1 is connected in series with the coil of a time delay relay TR2 with normally open contacts and timed to close after a predetermined short time interval, for example, one second, if the contacts of the mercury switch MS1 remain closed that long as an indication that the rotating assembly supporting the grinding wheel W has been displaced radially upwardly by the preloaded spring 35.

The actuating means illustrated in FIG. 8 includes a solenoid S3 with an armature 141' pivotally supporting a pawl 139' for engagement with the ratchet wheel 135. The armature 141' is biased to the right as seen in FIG. 8 by a return spring 145', and is limited in its travel to the left by the adjustable stop 143'. The pawl 139' is biased counterclockwise into engagement with the ratchet wheel 135 by the biasing spring 147'. The solenoid S3 is connected through the normally closed contacts of a time delay relay TR3 to the normally open contacts of time delay relay TR2 so that the solenoid S3 is energized to reduce the preload on spring 35 each time the normally open contacts of time delay relay TR2 are closed. The time delay relay TR3 is timed so that both the opening and the closing of the contacts are delayed a predetermined short interval, for example, two seconds in each instance. Since the time delay relay TR3 is connected in parallel with the solenoid S3, it is energized simultaneously with solenoid S3 so that solenoid S3 is operated before the contacts of time delay relay TR3 are opened. Moreover, since the closure of the contacts of the time delay relay TR3 is also delayed, the rotating assembly supporting the grinding wheel W is allowed to stabilize at the new reduced preload condition of the spring 35 before the circuit including the mercury switch MS1 is re-established through the contacts of time delay relay TR3.

Thus, it will be seen that the configuration illustrated in FIG. 8 is responsive to a different impulse but is otherwise equivalent to the configuration in FIG. 6 to reduce the preload on spring 35 consistent with the reduction in the weight of the grinding wheel W.

Referring now to FIGS. 1 and 2 with further regard to the operation of the simplest modification of the instant invention illustrated in these figures, the stabilizing and supporting means 20 is shown in FIG. 1 in its inoperative condition, although the grinding wheel W and the rotating assembly on which it is mounted are shown shifted to the left as seen in FIG. 1 into the wheel balancing position in order to show the hub supported member 91 in operative relation to the shoe 81. However, it should be understood that when the heavy biasing spring 35 is properly preloaded to produce an initial force at least slightly less than the opposing force due to the weight of the wheel W and the rotating assembly on which it is mounted, the movement of the wheel W into the position illustrated in FIG. 1 will cause the hub supported member 91 to depress the shoe 81 until the lower end of the dependent hollow sleeve 83 engages the upper end of the hollow plunger 31, in turn depressing the hollow plunger 31 sufficiently to disengage it from the dependent shoulder 25 so that the heavy biasing spring 35 thereafter becomes effective to resist further downward mean radial deflection.

Since the weight of the grinding wheel W is reduced substantially during its useful life and since the spring 35 must be preloaded to exert an initial force at least slightly less than the minimum opposing force due to the weight of the grinding wheel W, it is most expedient to set the preload of the spring 35 so that it exerts an initial force slightly less than the opposing force exerted when the grinding wheel W is reduced to its minimum size, because the stabilizing and auxiliary supporting means performs satisfactorily at this preload setting for many applications over the entire range of grinding wheel weights, or when different wheels are used. However, this embodiment of the instant invention can conveniently be modified to more closely limit the maximum downward mean radial deflection by incorporating in the device illustrated in FIG. 1 in place of the threaded plug 27 a manually adjustable stop 51 as illustrated in FIG. 4.

For normal operation of the preferred embodiment of the instant invention illustrated in FIGS. 3, 4, and 5, the vertical displacement of the socket 41 by the piston 95 eliminates the necessity for limiting the preload on spring 35 to a force slightly less than the opposing force due to the weight of the grinding wheel W and the rotating assembly on which it is mounted including the wheel hub 74. Instead, the preload on spring 35 is so adjusted that the upward mean radial deflection produced by piston 95 with the minimum wheel weight anticipated is about equal to the downward mean radial deflection with the maximum wheel weight anticipated. In addition, the preload on spring 35 can be adjusted to similarly accommodate different ranges of wheel weight by manual adjustment of the adjustable stop 51.

By adding to the configuration illustrated in FIG. 3, FIGS. 6 and 7 or the apparatus illustrated in FIG. 8, the adjustable stop 51' is automatically adjusted as the weight of a given grinding wheel W is changed so that the mean radial displacement from the fixed axis about which the grinding wheel W is rotated below its critical speed is maintained at or very close to zero, without significantly interfering with the small cyclic radial displacements essential to a successful balancing operation.

As an alternative to the configuration illustrated in FIG. 2, FIG. 9 illustrates a configuration in which the shoe 81 provided with a pair of angularly offset flats 82 is modified so that it is provided with a single large horizontal flat 82' on its upper surface, and the hub supported member 91 is modified so that it is provided with a single large flat 92' replacing the angularly offset flats 92.

Thus, the instant invention provides various arrangements of a stabilizing and supporting means for a rotating element effective to reduce or substantially eliminate mean radial deflection of the rotating element when it is supported for rotation above its critical speed without significantly interfering with the small cyclic radial displacements characteristic of such rotation of a slightly unbalanced rotating element.

It is to be understood that the present disclosure is for the purpose of illustration only and that this invention includes all modifications and equivalents of the apparatus described falling within the scope of the appended claims.

I claim:

1. In apparatus including a rotating element normally supported for rotation below its critical speed about a predetermined fixed axis and selectively yieldably supported for rotation above its critical speed about its center of gravity,
   a stabilizing and supporting means for the rotating element including
   a fixed support means,
   a shoe supporting means supported by and movable relative to said fixed support means,
   a relatively very powerful primary biasing means supported by said support means so that said biasing means urges said shoe supporting means toward the rotating element,
   said primary biasing means comprising a yieldable element arranged to be preloaded by the application thereto of a substantial force less than the opposing force tending to produce radial displacement of the rotating element when it is yieldably supported for rotation above its critical speed,
   a primary stop means arranged to limit displacement of said shoe supporting means by said primary biasing means,
   a shoe means movably mounted upon said shoe supporting means,
   a shoe engaging means rotatably mounted upon the rotating element and provided with at least one shoe engaging surface so shaped and arranged that said shoe engaging means is prevented from rotating by its engagement with said shoe means, and
   a relatively very weak secondary biasing means supported by said shoe supporting means so that said secondary biasing means urges said shoe means toward said shoe engaging means,
   said stabilizing and supporting means being so located that said secondary biasing means acts to maintain said shoe means in engagement with said shoe engaging means when the rotating element is supported for rotation about its predetermined fixed axis and so that limited radial displacement of the rotating element relative to its predetermined fixed axis disengages said primary biasing means from said primary stop means when the rotating element is yieldably supported with the result that further radial displacement of the rotating element is yieldably constrained by said primary biasing means.

2. Apparatus as described in claim 1, and, in addition,
   an adjustable constraining means supported in fixed relation to said primary stop means so as to apply a preload to said primary biasing means determined by the position of said constraining means, and
   an adjustment means for said constraining means operable to move said constraining means into different fixed positions relative to said primary stop means to apply different preloads to said primary biasing means,
   whereby said stabilizing and supporting means may be compensated for changes in the weight of the rotating element.

3. Apparatus as described in claim 1, and, in addition,
   a socket means movably mounted upon said fixed support means supporting said primary stop means and enclosing said shoe supporting means and said primary biasing means,
   an actuating means operative to displace said socket means relative to said fixed support means a predetermined distance toward the rotating element, and
   a control means operative before the rotating element is yieldably supported for rotation above its critical speed to operate said actuating means.

4. Apparatus as described in claim 3, and, in addition,
   an adjustable constraining means supported by said socket means in fixed relation to said primary stop means so as to apply a preload to said primary biasing means, and
   an adjustment means for said constraining means operable to change the position of said adjustable constraining means relative to said primary stop means to change the preload upon said primary biasing means,
   whereby said stabilizing and supporting means may be compensated for changes in the weight of the rotating element.

5. In a grinding machine including a given rotating grinding wheel normally supported for rotation below its critical speed about a predetermined fixed horizontal axis and selectively radially yieldably supported for rotation above its critical speed about its center of gravity during a grinding wheel balancing operation,
   a stabilizing and supporting means for the given grinding wheel including
   a fixed support means mounted adjacent to the given grinding wheel,
   a shoe supporting means movably mounted upon said fixed support means,
   a primary biasing means supported by said support means so that said primary biasing means urges said shoe supporting means toward the given grinding wheel,
   a primary stop means supported by said support means arranged to limit the displacement of said shoe supporting means responsive to said primary biasing means,
   a shoe means movably mounted upon said shoe supporting means for engagement with shoe engagement means connected to the given grinding wheel, a secondary biasing means arranged to produce limited displacement of said shoe means relative to said shoe supporting means toward the given grinding wheel, an adjustable constraining means supported in fixed relation to said primary stop means so as to impose upon said primary biasing means the necessary preload for stabilizing and supporting the given grinding wheel, an adjustment means operative to change the position of said constraining means relative to said primary stop means so as to reduce the preload imposed on said primary biasing means in a predetermined relation to the weight of the given grinding wheel as the weight of the given grinding wheel is reduced, an actuating means operative to displace said adjustment means in the sense necessary to reduce the preload imposed upon said primary biasing means, and an automatic control means responsive to a significant reduction in the weight of the given grinding wheel to operate said actuating means during a predetermined operation of the grinding machine, whereby the force exerted by said stabilizing and supporting means opposing the force exerted as a function of the weight of the given grinding wheel is reduced as the weight of the given grinding wheel is reduced.

6. In a grinding machine including a given rotating grinding wheel normally supported for rotation below its critical speed about a predetermined fixed horizontal axis and selectively radially yieldably supported for rotation above its critical speed about its center of gravity, a stabilizing and supporting means for the given grinding wheel including a fixed support means mounted below the given grinding wheel, a shoe supporting means movably mounted upon said fixed support means, a primary biasing means supported by said support means so that said primary biasing means urges said shoe supporting means upwardly toward the given grinding wheel, a primary stop means supported by said support means arranged to limit the displacement of said shoe supporting means responsive to said primary biasing means, a shoe means movably mounted upon the upper extremity of said shoe supporting means, a secondary biasing means arranged to produce limited upward displacement of said shoe means relative to said shoe supporting means, an adjustable constraining means supported in fixed relation to said primary stop means so as to impose upon said primary biasing means the necessary preload for stabilizing and supporting the given grinding wheel, an adjustment means operative to change the position of said constraining means relative to said primary stop means so as to reduce the preload imposed on said primary biasing means as the weight of the given grinding wheel is reduced, an adjustment actuating means operative to displace said adjustment means by a predetermined amount in the direction to reduce the preload imposed upon said primary biasing means, and an automatic control means effective to operate said adjustment actuating means in response to an impulse produced during a predetermined operating cycle of the grinding machine indicative of a reduction in the weight of the given grinding wheel, whereby the upward force exerted by said stabilizing and supporting means opposing the force exerted as a function of the weight of the given grinding wheel is reduced as the weight of the given grinding wheel is reduced.

7. Apparatus as described in claim 6, and, in addition, a socket means movably mounted upon said fixed support means supporting said primary stop means and enclosing said shoe supporting means and said primary biasing means, a socket actuating means operative to displace said socket means relative to said fixed support means a predetermined distance toward the rotating element, and a control means operative before the rotating element is yieldably supported for rotation above its critical speed to operate said socket actuating means.

8. Apparatus as described in claim 7, wherein said automatic control means includes a coupling means connecting said adjustment actuating means to a truing means incorporated in the grinding machine and operable according to a predetermined operating cycle to reduce the diameter and hence the weight of the given grinding wheel, said coupling means being operative to transmit a triggering impulse from the truing means to said adjustment means in response to selected operating cycles of the truing means.

9. Apparatus as described in claim 7 wherein said automatic control means includes a detecting means incorporated in the grinding machine and operable during a predetermined operating cycle to detect an impulse indicative of a reduction of the weight of the given grinding wheel, and a means for transmitting an actuating signal from said detecting means to said adjustment means every time the detecting means detects a predetermined significant reduction in the weight of the given grinding wheel.

10. Apparatus as described in claim 9, and, in addition, a shoe engaging means rotatably connected to and projecting from the given grinding wheel and provided with at least one shoe engaging surface so shaped and arranged that said shoe engaging means is prevented from rotating by its engagement with said shoe means, and wherein said detecting means comprises a switch means mounted fixedly upon said shoe engaging means and responsive to a predetermined critical change in the attitude of said switch means to produce an actuating signal.

References Cited

UNITED STATES PATENTS

| | | | |
|---|---|---|---|
| 1,967,163 | 7/1934 | Thearle | 51—169 |
| 2,142,021 | 12/1938 | Ernst et al. | 51—169 |
| 2,507,558 | 5/1950 | Dall et al. | 51—169 X |
| 2,894,360 | 7/1959 | Alvord | 51—165 |
| 3,107,550 | 10/1963 | Backer et al. | 51—169 X |
| 3,218,884 | 11/1965 | Backer et al. | 51—169 X |

LESTER M. SWINGLE, *Primary Examiner.*